(12) United States Patent
Wan et al.

(10) Patent No.: US 10,569,653 B2
(45) Date of Patent: Feb. 25, 2020

(54) DRIVER INTERFACE SYSTEM

(71) Applicant: Karma Automotive, LLC, Irvine, CA (US)

(72) Inventors: Dirk Wan, Costa Mesa, CA (US); David Witt, Newport Beach, CA (US); Andre Franco Luis, Orange, CA (US); Andreas Thurner, Irvine, CA (US); Alexander Klatt, Laguna Niguel, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 0 days.

(21) Appl. No.: 15/818,623

(22) Filed: Nov. 20, 2017

(65) Prior Publication Data
US 2019/0152319 A1    May 23, 2019

(51) Int. Cl.
*G06F 3/01* (2006.01)
*B60K 35/00* (2006.01)
*B62D 1/04* (2006.01)
*G06F 3/0488* (2013.01)
*B60K 37/06* (2006.01)

(52) U.S. Cl.
CPC .............. *B60K 35/00* (2013.01); *B60K 37/06* (2013.01); *B62D 1/046* (2013.01); *G06F 3/013* (2013.01); *G06F 3/04883* (2013.01); *B60K 2370/122* (2019.05); *B60K 2370/128* (2019.05); *B60K 2370/143* (2019.05); *B60K 2370/149* (2019.05); *B60K 2370/1438* (2019.05); *B60K 2370/1476* (2019.05); *B60K 2370/152* (2019.05); *B60K 2370/158* (2019.05); *B60K 2370/161* (2019.05); *B60K 2370/164* (2019.05); *B60K 2370/166* (2019.05); *B60K 2370/186* (2019.05); *B60K 2370/191* (2019.05); *B60K 2370/345* (2019.05); *B60K 2370/52* (2019.05); *B60K 2370/736* (2019.05); *B60K 2370/744* (2019.05); *B60K 2370/782* (2019.05)

(58) Field of Classification Search
CPC ..................................................... G06F 3/0488
See application file for complete search history.

(56) References Cited

U.S. PATENT DOCUMENTS

2002/0085043 A1* 7/2002 Ribak ................... B60K 35/00 715/810
2007/0120830 A1* 5/2007 Kammerer ............. B60K 35/00 345/173

(Continued)

*Primary Examiner* — David E Choi
(74) *Attorney, Agent, or Firm* — Gordon & Rees LLP

(57) ABSTRACT

A driver interface system includes a steering wheel assembly and a display. The steering wheel assembly includes a variable-function input device. The variable-function input device includes a plurality of assignable functions and a present function being one of the plurality of assignable functions. The display is configured to display an image corresponding to the present function of the variable-function input device. The driver interface system may include a plurality of display modes, and in response to a change in display mode, the driver interface system may change the present function in the plurality of assignable functions. The steering wheel assembly may also include a touchpad configured to receive a handwritten input, and the display may be configured to display an image corresponding to the handwritten input.

19 Claims, 8 Drawing Sheets

(56) References Cited

U.S. PATENT DOCUMENTS

| | | | | |
|---|---|---|---|---|
| 2009/0085880 A1* | 4/2009 | Vitale | ............... | B60R 11/0264 |
| | | | | 345/173 |
| 2012/0326989 A1* | 12/2012 | Verthein | ............... | G06F 3/016 |
| | | | | 345/173 |
| 2013/0222304 A1* | 8/2013 | Taguchi | ............... | G06F 3/041 |
| | | | | 345/173 |
| 2014/0168130 A1* | 6/2014 | Hirai | ............... | G10L 15/00 |
| | | | | 345/173 |
| 2014/0309860 A1* | 10/2014 | Paulin | ............... | B60B 3/165 |
| | | | | 701/36 |
| 2015/0352953 A1* | 12/2015 | Koravadi | ............... | B60K 37/06 |
| | | | | 701/36 |
| 2016/0144714 A1* | 5/2016 | Kim | ............... | B60K 35/00 |
| | | | | 701/36 |
| 2016/0167512 A1* | 6/2016 | Joo | ............... | B60K 35/00 |
| | | | | 345/167 |
| 2016/0202894 A1* | 7/2016 | Kim | ............... | G06F 3/04847 |
| | | | | 715/716 |
| 2017/0059872 A1* | 3/2017 | Banyay | ............... | G02B 27/0179 |
| 2018/0008161 A1* | 1/2018 | Shin | ............... | A61B 5/0476 |

* cited by examiner

DRIVER INTERFACE SYSTEM

BACKGROUND

As the computing power and connectivity of modern vehicles increases, users expect vehicles to perform an increasing number of functions, and interfaces used to enable all the expected functions become more numerous and more complex. In one solution to increase the functionality of a car, more controls or buttons are added to the steering wheel. However, the number of buttons that can be added to the steering wheel is severely limited because the buttons must be large enough to be usable, the steering wheel must be small enough to grasp and to turn, and an airbag must fit within the steering wheel. Additionally, when too many buttons are placed on the steering wheel, a user concentrating on driving may not be able to easily operate the many buttons, and may not be able to remember their locations. To activate a desired function, the user will have to look at the steering wheel for a relatively long time to distinguish the many different buttons, thus focusing his/her/her eyes farther from the road and other driving obstacles.

In another solution to increase the functionality of a car, more buttons are added to an area other than the steering wheel, such as a center console. This solution generally increases the number of available functions, but also requires a user to reach over to the center console. Thus, the user has a significantly worse grip on the steering wheel, is even less likely to easily operate the numerous buttons or to remember their locations, and will focus his/her/her eyes farther from the road more often.

Thus, there is a need in the art to achieve a high functionality driver interface system that overcomes the deficiencies in the art.

SUMMARY

The present disclosure is directed to a driver interface system, substantially as shown in and/or described in connection with at least one of the figures, and as set forth in the claims.

DETAILED DESCRIPTION

Figure 1:
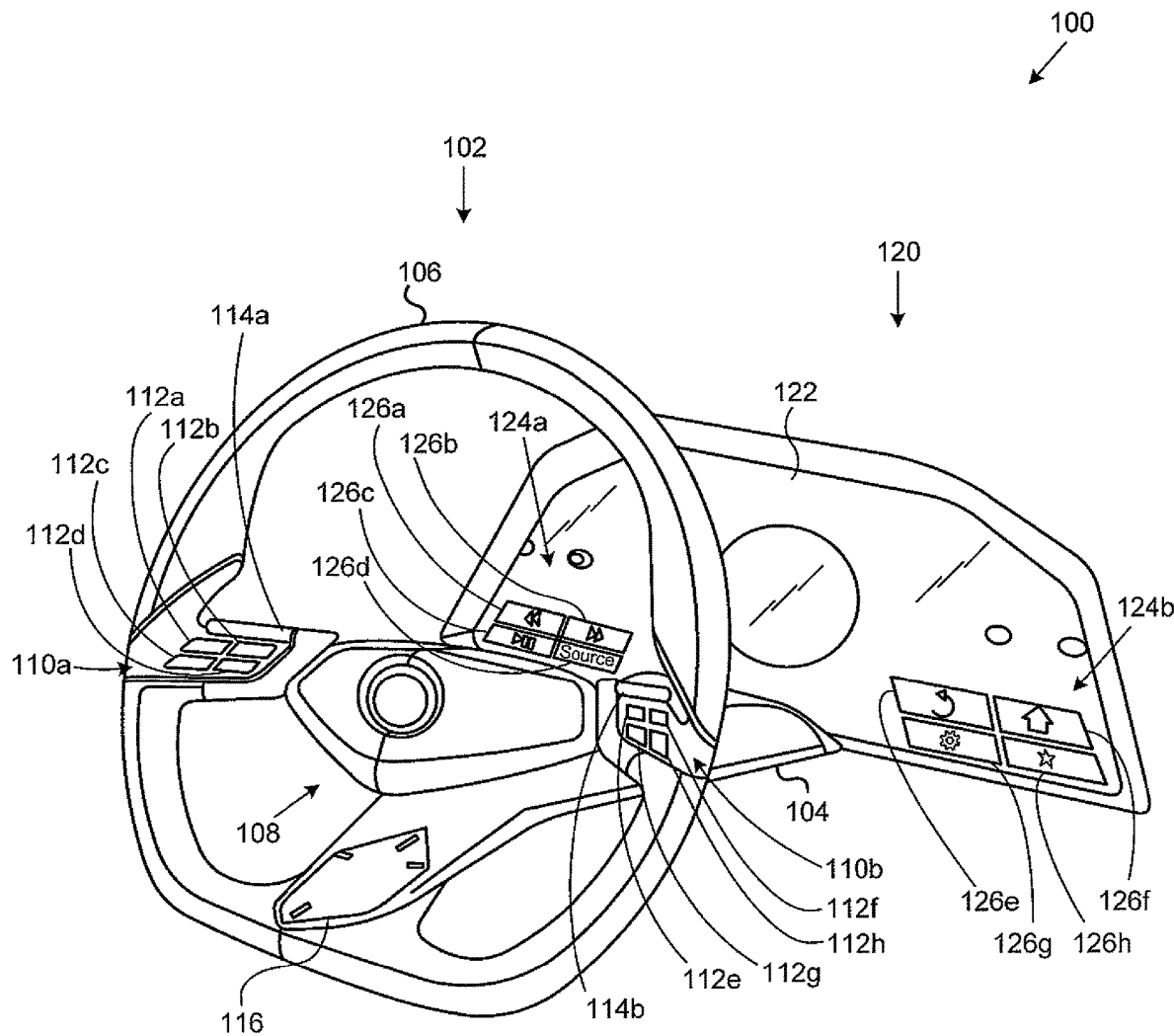
FIG. 1 illustrates a perspective view of a portion of a driver interface system according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates a perspective view of a portion of a driver interface system according to one implementation of the present application. As illustrated in FIG. 1, driver interface system 100 includes steering wheel assembly 102, having steering column 104, steering wheel 106, center region 108, input areas 110a and 110, buttons 112a, 112b, 112c, 112d, 112e, 112f, 112g, and 112h, collectively referred to as buttons 112, rotary dials 114a and 114b, and touchpad 116. Driver interface system 100 also includes dashboard 120 having display 122, image areas 124a and 124b, and images 126a, 126b, 126c, 126d, 126e, 126f, 126g, and 126h, collectively referred to as images 126.

In the present implementation, steering wheel 106 is substantially circular (flattened at the bottom), encircling center region 108. Input area 110a is connected between the left part of steering wheel 106 and center region 108, and input area 110 is connected between the right part of steering wheel 106 and center region 108. Buttons 112a, 112b, 112c, and 112d are located on input area 110a, and buttons 112e, 112f, 112g, and 112h are located on input area 110b. Rotary dial 114a is located on input area 110a above buttons 112a, 112b, 112c, and 112d, and rotary dial 114b is located on input area 110b above buttons 112e, 112f, 112g, and 112h. Buttons 112 are input devices that generate an input signal in response to being pressed. Rotary dials 114a and 114b are input devices that generate an input signal in response to being rotated or rolled. In the present implementation, rotary dials 114a and 114b rotate vertically. Rotary dials 114a and 114b may also generate an input signal in response to being pressed.

Touchpad 116 is connected between the bottom part of steering wheel 106 and center region 108. Touchpad 116 is an input device that generates an input signal in response to handwriting or other gestures. Driver interface system 100 uses input signals generated by buttons 112, rotary dials 114a and 114b, and touchpad 116 to perform numerous functions, such as initiating calls, changing display modes, and inputting information. Additional examples of functions that driver interface system 100 can perform are described further below; however, which specific functions driver interface system 100 performs are not limitations of the present disclosure. In another implementation, the locations and connections of the elements of steering wheel assembly 102 may be different than shown in FIG. 1. In various implementations, input areas 110a and 110b may have more or fewer than four buttons 112. In various implementations, rotary dials 114*a* and 114*b* may rotate in any other direction. For example, rotary dials 114*a* and 114*b* may rotate horizontally.

Center region 108 is connected between input areas 110*a* and 110*b* and steering column 104. Center region 108 may house a horn device and an airbag (not shown in FIG. 1). Center region may also house circuitry to transfer signals between input areas 110*a* and 110*b* and steering column 104, and between touchpad 116 and steering column 104. Steering column 104 is connected between center region 108 and dashboard 120. In addition to transferring mechanical force between steering wheel 106 and other steering components, steering column 104 may house circuitry to transfer signals between steering wheel assembly 102 and dashboard 120. Steering column 104 may also house actuators or other means known in the art to adjust the position of steering wheel assembly 102.

Dashboard 120 includes display 122. Display 122 may be, for example, an organic light emitting diode (OLED) display. In the present implementation, the center of display 122 is aligned with the center of steering wheel assembly 102, and positioned above steering column 104. In one implementation, the shape of display 122 matches the shape of the top part of steering wheel 106; thus, visibility of display 122 is increased. Display 122 displays image areas 124*a* and 124*b*, and may also display a speedometer and other instrument readings. Image area 124*a* is on the left side of display 122, and image area 124*b* is on the right side of display 122. Image area 124*a* has four images 126*a*, 126*b*, 126*c*, and 126*d*, and image area 124*b* has four images 126*e*, 126*f*, 126*g*, and 126*h*. Images 126*a*, 126*b*, 126*c*, 126*d*, 126*e*, 126*f*, 126*g*, and 126*h* correspond to present functions of buttons 112*a*, 112*b*, 112*c*, 112*d*, 112*e*, 112*f*, 112*g*, and 112*h* respectively, as described further below. In the present implementation, the location of image areas 124*a* and 124*b* on display 122 matches the location of input areas 110*a* and 110*b* on steering wheel 106, and the shape of images 126 matches the shape of buttons 112, to indicate to a user that these elements correspond. In other implementations, images 126 may have different shapes, and image areas 110*a* and 110*b* may be located elsewhere on display 122. In another implementation, display 122 may have a different shape than steering wheel 106. In another implementation, display 122 may be positioned elsewhere on dashboard 120.

Figure 2:
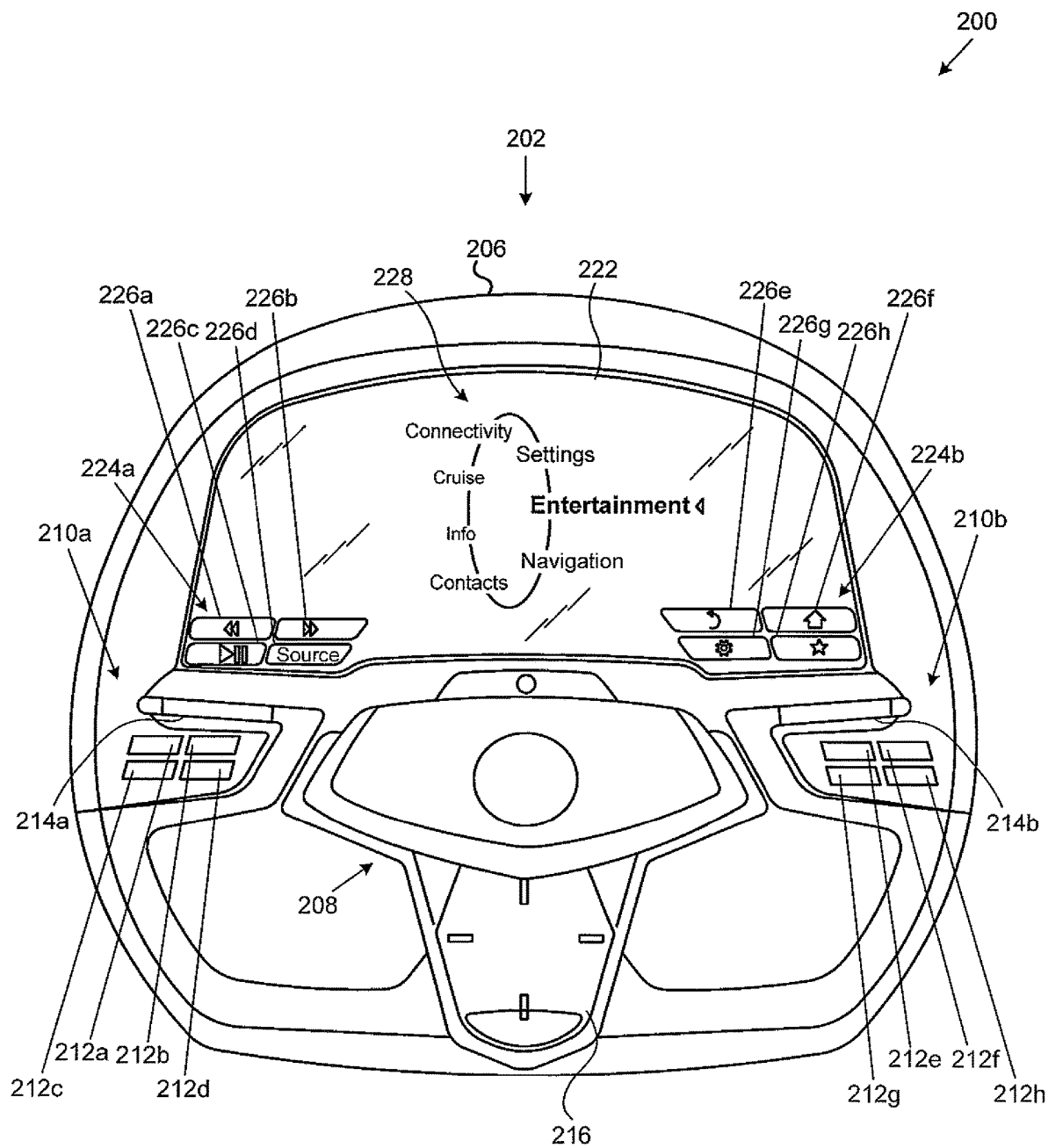
FIG. 2 illustrates a front view of a portion of a driver interface system according to one implementation of the present application.

FIG. 2 illustrates a front view of a portion of a driver interface system according to one implementation of the present application. As illustrated in FIG. 2, driver interface system 200 includes steering wheel assembly 202, having steering wheel 206, center region 208, input areas 210*a* and 210*b*, buttons 212*a*, 212*b*, 212*c*, 212*d*, 212*e*, 212*f*, 212*g*, and 212*h*, collectively referred to as buttons 212, rotary dials 214*a* and 214*b*, and touchpad 216. Driver interface system 200 also includes display 222, image areas 224*a* and 224*b*, and images 226*a*, 226*b*, 226*c*, 226*d*, 226*e*, 226*f*, 226*g*, and 226*h*, collectively referred to as images 226, and display mode menu 228. Driver interface system 200 in FIG. 2 may generally correspond to driver interface system 100 in FIG. 1. FIG. 2 may illustrate driver interface system 200 as seen by a user sitting in a driver seat.

Each of buttons 212 has a plurality of assignable functions and a present function that is one of its plurality of assignable functions. Buttons 212 are considered variable-function input devices. As used herein, the term "assignable functions" refers to all possible functions that a driver interface system can perform using a given variable-function input device. As used herein, the term "present function" refers to the function the driver interface system actually performs when a variable-function input device is activated. As used herein, the term "variable-function input device" is an input device that has two or more different functions resulting from similar activation means.

Display mode menu 228 in FIG. 2 shows seven display modes, including an entertainment mode, a navigation mode, a settings mode, a contacts mode, a connectivity mode, a cruise/autonomous mode, and a vehicle information mode. When driver interface system 200 is in a given display mode, the present functions of buttons 212 are chosen from a subset of associated assignable functions. In FIG. 2, driver interface system 200 is in entertainment mode, and the present functions of buttons 212 are chosen from a subset of assignable functions associated with controlling entertainment systems. In particular, the present functions of buttons 212 are shown in Table 1 below:

TABLE 1

| Button | Present Function | Description of Function |
|---|---|---|
| 212a | Seek previous | Accesses previous media in a list |
| 212b | Seek next | Accesses next media in a list |
| 212c | Play/pause | If paused, plays current media; if playing, pauses current media |
| 212d | Source | Cycles media source (e.g. AM/FM/XM/AUX) |
| 212e | Back | Returns to a previous screen |
| 212f | Home | Returns to a home screen |
| 212g | Settings | Opens a settings screen |
| 212h | Favorites | Accesses list of favorite media |

Rotary dial 214*a* can have a volume control function. It can be rotated up to raise volume, rotated down to lower volume, or pressed to mute volume. Rotary dial 214*b* can have a menu select function, as described further below. As shown in FIG. 2, display 222 displays images 226 corresponding to the present function of buttons 212. Images 226*a*, 226*b*, 226*c*, 226*d*, 226*e*, 226*f*, 226*g*, and 226*h* correspond to the present functions of buttons 212*a*, 212*b*, 212*c*, 212*d*, 212*e*, 212*f*, 212*g*, and 212*h* respectively. Images 226 may be a symbol, text, picture, moving picture loop, or any other type of image. Driver interface system 200 uses images 226 to indicate the present functions of buttons 212 to a user. In another implementation, rotary dials 214*a* and 214*b* may be variable-function input devices, and may change function in response to a change in display mode. In another implementation, display 322 may also display images corresponding to the present functions of rotary dials 314*a* and 314*b*. In another implementation, display 222 may display images 226 other than those shown in FIG. 2 to indicate the present functions of buttons 212. In another implementation, the present functions of buttons 212 while in entertainment mode may differ from those in Table 1. In various implementations, display mode menu 228 may have more or fewer than seven display modes.

Display mode menu 228 in FIG. 2 also shows display modes arranged as a perspective circular list. The presently selected display mode (entertainment mode in FIG. 2) is displayed with a large font at the foreground of the perspective circular list. Other display modes are displayed with decreasing font size toward the back of the perspective circular list. In response to a user action, driver interface system 200 may change the selected display mode in display mode menu 228. For example, a user may rotate rotary dial 214*b*, and display mode menu 228 may rotate until another display mode is selected. In this example, the rotation direction of display mode menu 228 may match the rotation direction of rotary dial 214b in order to indicate to a user how to select another display mode. As another example, a user may activate a button, such as button 212e or another button, to select a previous display mode. As yet another example, a user may speak a voice command to a microphone (not shown in FIG. 2) to select another display mode. Driver interface system 200 may also change the selected display mode in display mode menu 228 without a user action, in response to a priority event. For example, driver interface system 200 may automatically select navigation mode when a vehicle deviates from a route guidance path. As another example, driver interface system 200 may automatically select contacts mode when a vehicle receives an incoming phone call. In various implementations, display mode menu 228 may show display modes arranged in a vertical list, a horizontal list, or any other manner.

When driver interface system 200 is in a given display mode, display 222 may display information associated with that display mode. For example, when driver interface system 200 is in entertainment mode, display 222 may display information such as a song title, artist, previous song, and next song. As another example, when driver interface system 200 is in navigation mode, display 222 may display a map and a route guidance path. As yet another example, when driver interface system 200 is in vehicle information mode, display 222 may display information such as a fuel consumption rate, battery consumption rate, and battery regeneration rate. In one implementation, this information may be displayed in addition to speedometer readings and other instrument readings. In one implementation, this information may be displayed in addition to display mode menu 228. In another implementation, this information may replace display mode menu 228 after the display mode finishes changing.

Figure 3A:
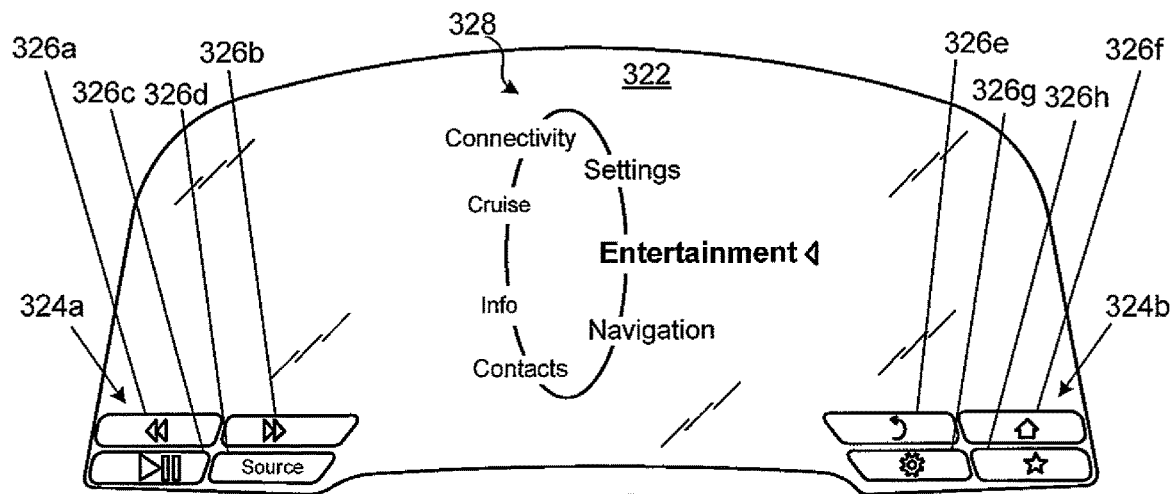
FIGS. 3A, 3B, and 3C illustrate front views of a portion of a display according to one implementation of the present application.
Figure 3B:
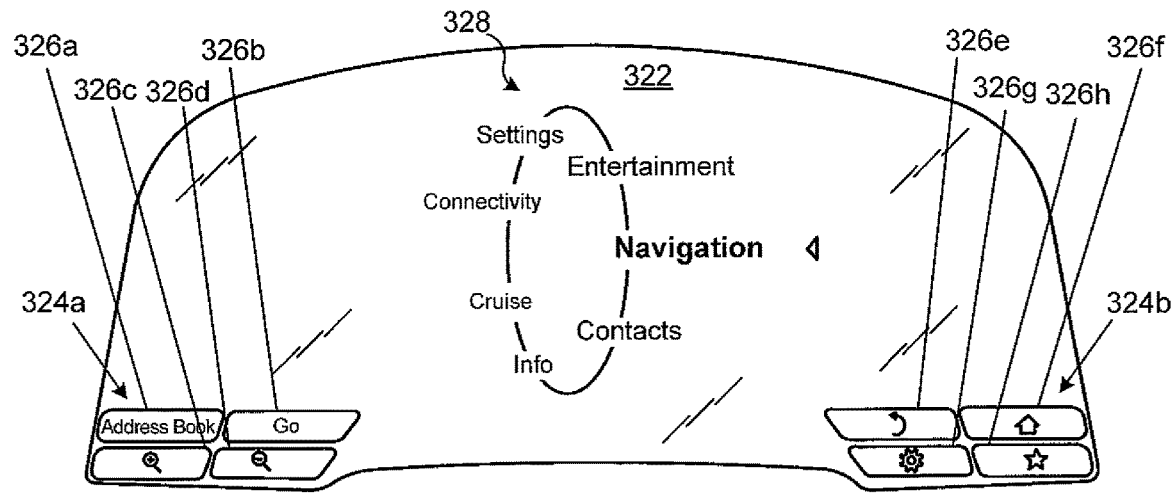
Figure 3C:
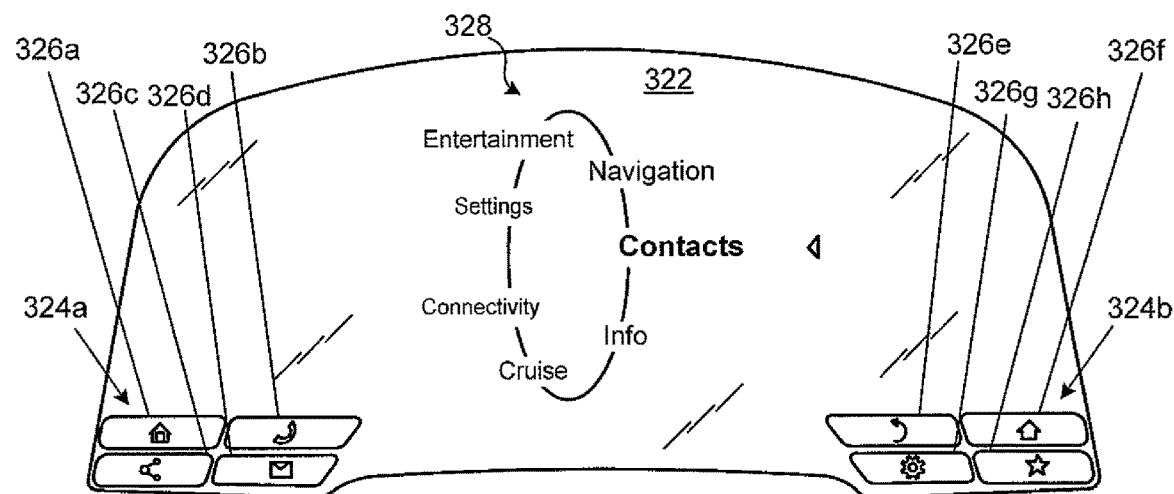

FIGS. 3A, 3B, and 3C illustrate front views of a portion of a display according to one implementation of the present application. As illustrated in FIGS. 3A, 3B, and 3C, display 322 includes image areas 324a and 324b, images 326a, 326b, 326c, 326d, 326e, 326f, 326g, and 326h, collectively referred to as images 326, and display mode menu 328. Display 322 in FIGS. 3A, 3B, and 3C may generally correspond to display 222 in FIG. 2.

When a display mode changes, the present function of a variable-function input device and its corresponding image also change. As shown in FIG. 3A, the driver interface system is in entertainment mode. The present functions of buttons 212 are as shown in Table 1 above. As shown in FIG. 3B, the display mode has changed from entertainment mode to navigation mode. The display mode may have changed in response to a user action, such as rotating rotary dial 214b, or in response to a priority event, such as detecting a vehicle deviating from a route guidance path. The present functions of buttons 212 are now chosen from a subset of assignable functions associated with controlling navigation systems. In particular, the present functions of buttons 212 are shown in Table 2 below:

TABLE 2

| Button | Present Function | Description of Function |
|---|---|---|
| 212a | Address Book | Accesses list of addresses |
| 212b | Go | Initiates route guidance |
| 212c | Zoom in | Zooms in on a map |
| 212d | Zoom out | Zoom out on a map |

TABLE 2-continued

| Button | Present Function | Description of Function |
|---|---|---|
| 212e | Back | Returns to a previous screen |
| 212f | Home | Returns to a home screen |
| 212g | Settings | Opens a settings menu |
| 212h | Favorites | Accesses list of favorite places |

Rotary dial 214a can have a volume control function. Rotary dial 214b can have a menu select function. As shown in FIG. 3B, display 322 displays images 326 corresponding to the present function of buttons 212. Images 326a, 326b, 326c, 326d, 326e, 326f, 326g, and 326h correspond to the present functions of buttons 212a, 212b, 212c, 212d, 212e, 212f, 212g, and 212h respectively. Images 326a, 326b, 326c, and 326d in FIG. 3B have changed from FIG. 3A to indicate that the present functions of buttons 212a, 212b, 212c, and 212d have changed. All buttons 212 are not required to change their present function with each change in display mode, especially where their present function is similarly applicable to multiple display modes. For example, images 326e, 326f, 326g, and 326h in FIG. 3B have not changed from FIG. 3A to indicate that the present functions of buttons 212e, 212f, 212g, and 212h remained similar despite the change from entertainment mode to navigation mode. In another implementation, display 322 may display images 326 other than those shown in FIG. 3B to indicate the present functions of buttons 212. In another implementation, the present functions of buttons 212 while in navigation mode may differ from those in Table 2.

As shown in FIG. 3C, the display mode has changed from navigation mode to contacts mode. The display mode may have changed in response to a user action, such as rotating rotary dial 214b, or in response to a priority event, such as a vehicle receiving an incoming phone call. The present functions of buttons 212 are now chosen from a subset of assignable functions associated with controlling contacts systems. In particular, the present functions of buttons 212 are shown in Table 3 below:

TABLE 3

| Button | Present Function | Description of Function |
|---|---|---|
| 212a | Phone book | Accesses a list of phone numbers |
| 212b | Connect | Initiates a phone call |
| 212c | Share | Shares current screen |
| 212d | Messages | Accesses a list of messages (e.g. emails or texts) |
| 212e | Back | Returns to a previous screen |
| 212f | Home | Returns to a home screen |
| 212g | Settings | Opens a settings menu |
| 212h | Favorites | Accesses list of favorite places |

Rotary dial 214a can have a volume control function. Rotary dial 214b can have a menu select function. As shown in FIG. 3C, display 322 displays images 326 corresponding to the present function of buttons 212. Images 326a, 326b, 326c, 326d, 326e, 326f, 326g, and 326h correspond to the present functions of buttons 212a, 212b, 212c, 212d, 212e, 212f, 212g, and 212h respectively. Images 326a, 326b, 326c, and 326d in FIG. 3C have changed from FIG. 3B to indicate that the present functions of buttons 212a, 212b, 212c, and 212d have changed. All buttons 212 are not required to change their present function with each change in display mode, especially where their present function is similarly applicable to multiple display modes. For example, images 326e, 326f, 326g, and 326h in FIG. 3C have not changed from FIG. 3B to indicate that the present functions of buttons 212e, 212f, 212g, and 212h remained similar despite the change from navigation mode to contacts mode. In another implementation, display 322 may display images 326 other than those shown in FIG. 3C to indicate the present functions of buttons 212. In another implementation, the present functions of buttons 212 while in contacts mode may differ from those in Table 3.

By using a variable-function input device, such as one of buttons 212, having a plurality of assignable functions and a present function being one of the plurality of assignable functions, along with display 222 that displays images 226 corresponding to the present function, driver interface system 200 achieves increased functionality. Driver interface system 200 can perform more functions, without increasing the number of buttons 212 on steering wheel 206, which has limited space. Additionally, a user does not need to take his/her/her hands off steering wheel 206, because he can activate all buttons 212 from steering wheel 206. Moreover, because images 226 indicate present functions on display 222, rather than on steeling wheel 206 or a center console, a user does not need to look as far from the road ahead.

Figure 4:
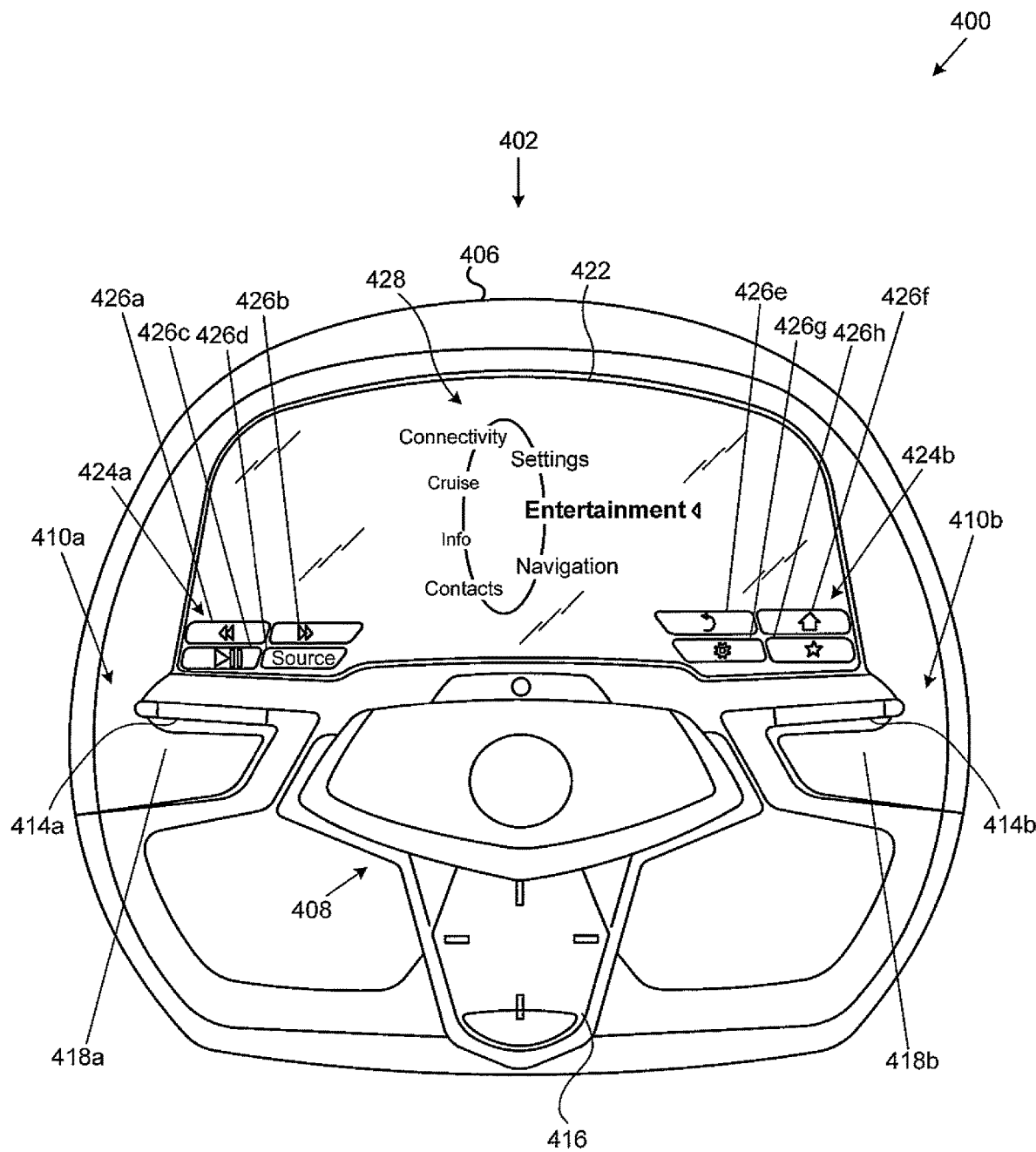
FIG. 4 illustrates a front view of a portion of a driver interface system according to one implementation of the present application.

FIG. 4 illustrates a front view of a portion of a driver interface system according to one implementation of the present application. As illustrated in FIG. 4, driver interface system 400 includes steering wheel assembly 402, having steering wheel 406, center region 408, input areas 410a and 410b, rotary dials 414a and 414b, touchpad 416, and touch screens 418a and 418b. Driver interface system 400 also includes display 422, image areas 424a and 424b, and images 426a, 426b, 426c, 426d, 426e, 426f, 426g, and 426h, collectively referred to as images 426, and display mode menu 428. Driver interface system 400 in FIG. 4 may generally correspond to driver interface system 200 in FIG. 2, except that buttons 212 in FIG. 2 have been replaced by touch screens 418a and 418b in FIG. 4. Like buttons 212, touch screens 418a and 418b are input devices that generate an input signal in response to being pressed. Unlike buttons 212, touch screens 418a and 418b can generate different input signals depending on where they are pressed. For example, in the present implementation, touch screens 418a and 418b each generate four input signals corresponding to being pressed in the upper left, upper right, lower left, and lower right parts, as described further below. Touch screens 418a and 418b may be, for example, capacitive sensors with force feedback. Thus, touch screens 418a and 418b can distinguish a light press from a hard press. Driver interface system 400 shown in FIG. 4 may have any of the implementations and advantages described above in relation to driver interface system 200 in FIG. 2.

Figure 5A:
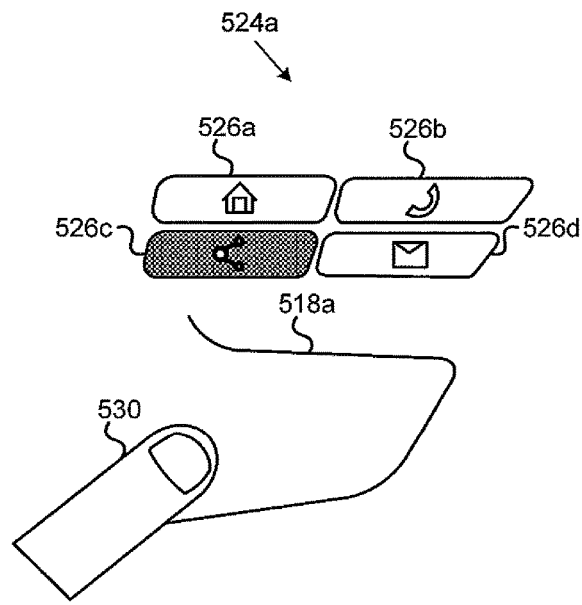
FIGS. 5A, 5B, 5C, and 5D illustrate comparative views of a portion of a variable-function input device and a portion of a display according to one implementation of the present application.
Figure 5B:
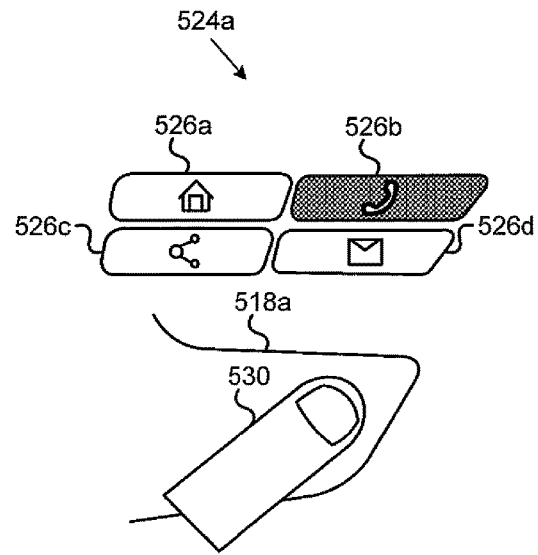
Figure 5C:
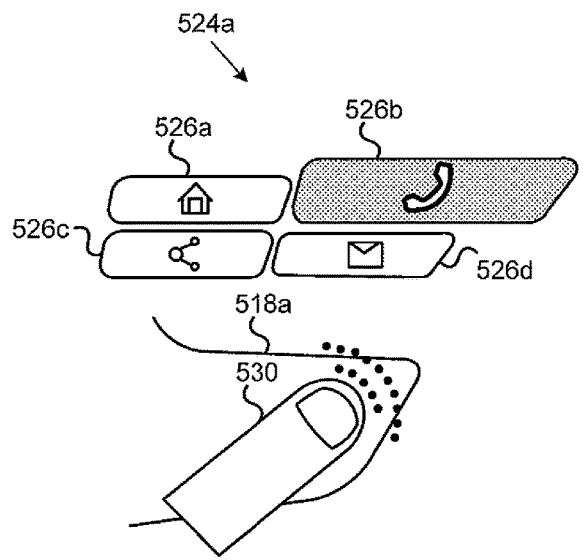

FIGS. 5A, 5B, 5C, and 5D illustrate comparative views of a portion of a variable-function input device and a portion of a display according to one implementation of the present application. FIGS. 5A, 5B, 5C, and 5D show touch screen 518a alongside image area 524a having images 526a, 526b, 526c, and 526d, collectively referred to as images 526. Touch screen 518a in FIGS. 5A, 5B, 5C, and 5D may generally correspond to touch screen 418a in FIG. 4. Images 526a, 526b, 526c, and 526d in FIGS. 5A, 5B, 5C, and 5D may generally correspond to images 426a, 426b, 426c, and 426d in FIG. 4. Although touch screen 518a may be on a steering wheel and image area 524a may be on a dashboard display, they are shown alongside each other in FIGS. 5A, 5B, 5C, and 5D for the purpose of comparison. FIGS. 5A, 5B, and 5C also show user's thumb 530.

In the present implementation, touch screen 518a generates four input signals corresponding to being pressed in the upper left, upper right, lower left, and lower right parts. A driver interface system, such as driver interface system 400 in FIG. 4, can use the input signals to perform four present functions. The shape of images 526 indicates to a user which part of touch screen 518a to press to perform the corresponding function. Images 526a, 526b, 526c, and 526d correspond to the present function of the upper left, upper right, lower left, and lower right parts of touch screen 518a respectively. Touch screen 518a is also considered a variable-function input device. When a display mode changes, the present function of a part of touch screen 518a and its corresponding image also change.

In FIGS. 5A, 5B, 5C, and 5D, the driver interface system is in contacts mode, and the present functions of the upper left, upper right, lower left, and lower right parts of touch screen 518a are similar to the present functions of buttons 212a, 212b, 212c, and 212d respectively shown in Table 3 above. In various implementations, touch screen 518a may be divided into more or fewer than four functions. In one implementation, touch screen 518a may be divided into more functions in a given display mode, and fewer functions in another display mode. Thus, the number of functions supported by touch screen 518a can increase or decrease when changing display modes without needing physical alteration. Rather than adding or removing buttons, the driver interface system can alter the parts of touch screen 518a to correspond to the desired number of functions, and change images 526 to match.

Touch screen 518a can distinguish a light press from a hard press using, for example, capacitive sensors and force feedback, or any other technique known in the art. As used herein, a "light press" refers to a pressure approximately equal to a resting pressure, such as the pressure of user's thumb 530 resting against touch screen 518a. As used herein, a "hard press" refers to a pressure greater than a light press, such as the pressure of user's thumb 530 flexing against touch screen 518a.

As shown in FIG. 5A, touch screen 518a detects a light press from user's thumb 530 on the bottom left part of touch screen 518a. In response to the light press, image area 524a highlights image 526c. In FIG. 5B, user's thumb 530 moves from the bottom left part to the top right part of touch screen 518a. Image area 524a stops highlighting image 526c. Touch screen 518a detects a light press from user's thumb 530 on the top right part of touch screen 518a. In response to the light press, image area 524a highlights image 526b.

In FIG. 5C, touch screen 518a detects a hard press from user's thumb 530 on the top right part of touch screen 518a. In response to the hard press, the driver interface system provides sensory feedback. As shown in FIG. 5C, image area 524a enlarges image 526b and highlights it using a different shade to provide visual feedback. In one implementation, touch screen 518a may provide haptic feedback. In another implementation, a speaker (not shown in FIGS. 5A, 5B, 5C, and 5D) may provide auditory feedback. In response to the hard press, the driver interface system also performs the present function corresponding to image 526b. In FIG. 5C, the present function corresponding to image 526b is a connect function, and the driver interface system initiates a phone call in response to the hard press.

Figure 5D:
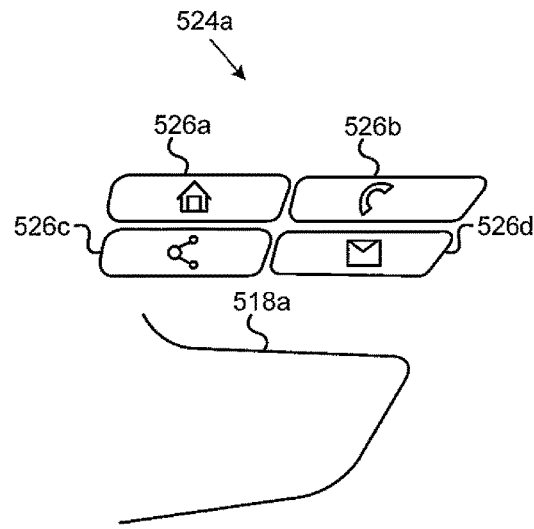

In FIG. 5D, user's thumb 530 is removed, touch screen 518a does not detect a press, and none of images 226 are highlighted. After the driver interface system performs the connect function in FIG. 5C, the present function corresponding to image 526b changes to a disconnect function in FIG. 5D. As shown in FIG. 5D, image 226b has changed from FIG. 5C to indicate the change in function. In FIG. 5D, a hard press from user's thumb 530 on the top right part of touch screen 518a would terminate a phone call.

By using a variable-function input device that distinguishes a light press from a hard press driver interface system 400 can prevent accidentally performing undesired functions. A user can rest his/her hands on and grip a steering wheel 406 without performing a function; a deliberate hard press may be required. Additionally, by highlighting images 526 on display 422 in response to touch screen 518a detecting a press, driver interface system 400 can indicate any number of functions to a user, steering wheel 406 itself need not be labeled with images, and a user need not look farther away from the road.

Figure 6A:
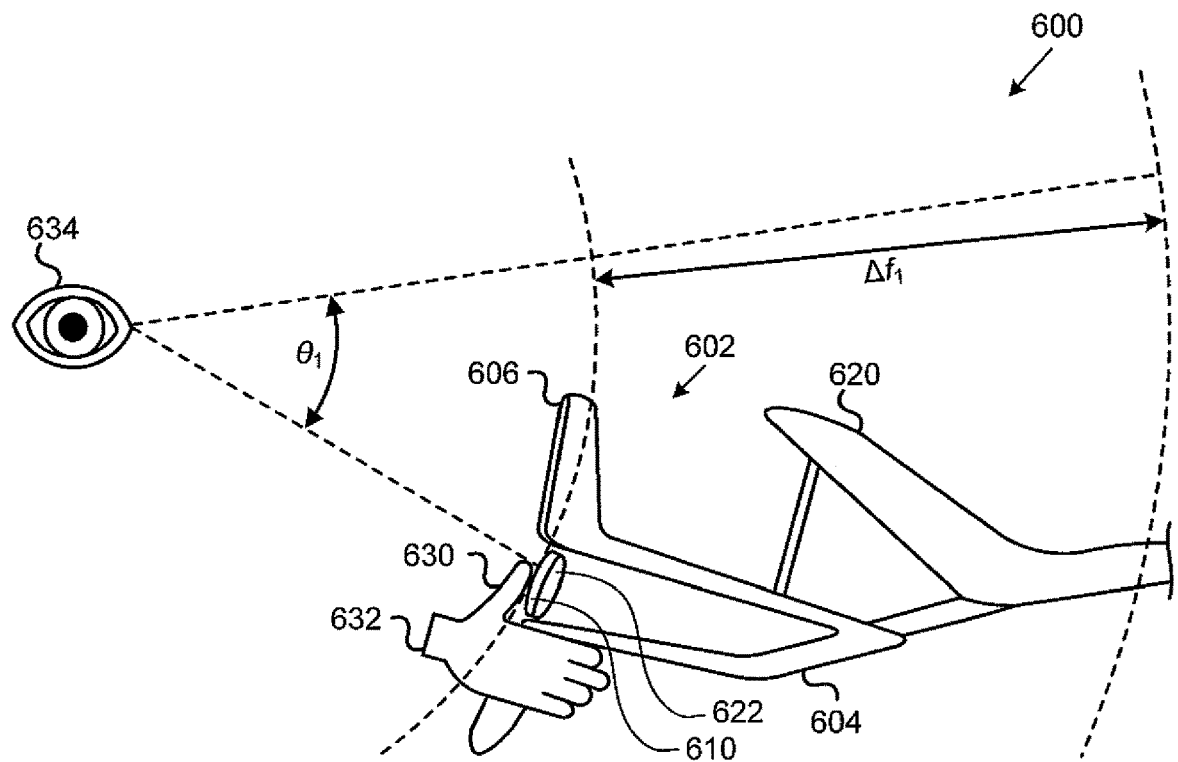
FIG. 6A illustrates a side view portion of an exemplary driver interface system according to one implementation of the present application.

FIG. 6A illustrates a side view portion of an exemplary driver interface system according to one implementation of the present application. As illustrated in FIG. 6A, driver interface system 600 includes steering wheel assembly 602, having steering column 604, steering wheel 606, input area 610, dashboard 620, user's thumb 630, user's hand 632, and user's eye 634. In the present implementation, display 622 is located on steering wheel assembly 602, integrated with input area 610. In another implementation, display 622 may be located elsewhere on steering wheel assembly 602, such as integrated with steering wheel 606. Display 622 displays images corresponding to present functions. However, in order for images to be seen be user's eye 634, display 622 lies in the plane of steering wheel 606 perpendicular to user's eye 632 (images not shown in the side view of FIG. 6A). Thus, input area 610 also lies in the plane of steering wheel 606. In order to activate a variable-function input device in input area 610, user's thumb 630 must press perpendicular to the plane of steering wheel 606. Additionally, when a user looking at display 622 reverts to looking at the road ahead, user's eye 634 rotates through refocus angle $\theta_1$, and it changes focus length by refocus length $\Delta f_1$. Because driver reaction time depends inversely on refocus angle and refocus length, lower refocus angle and refocus length can improve reaction time.

Figure 6B:
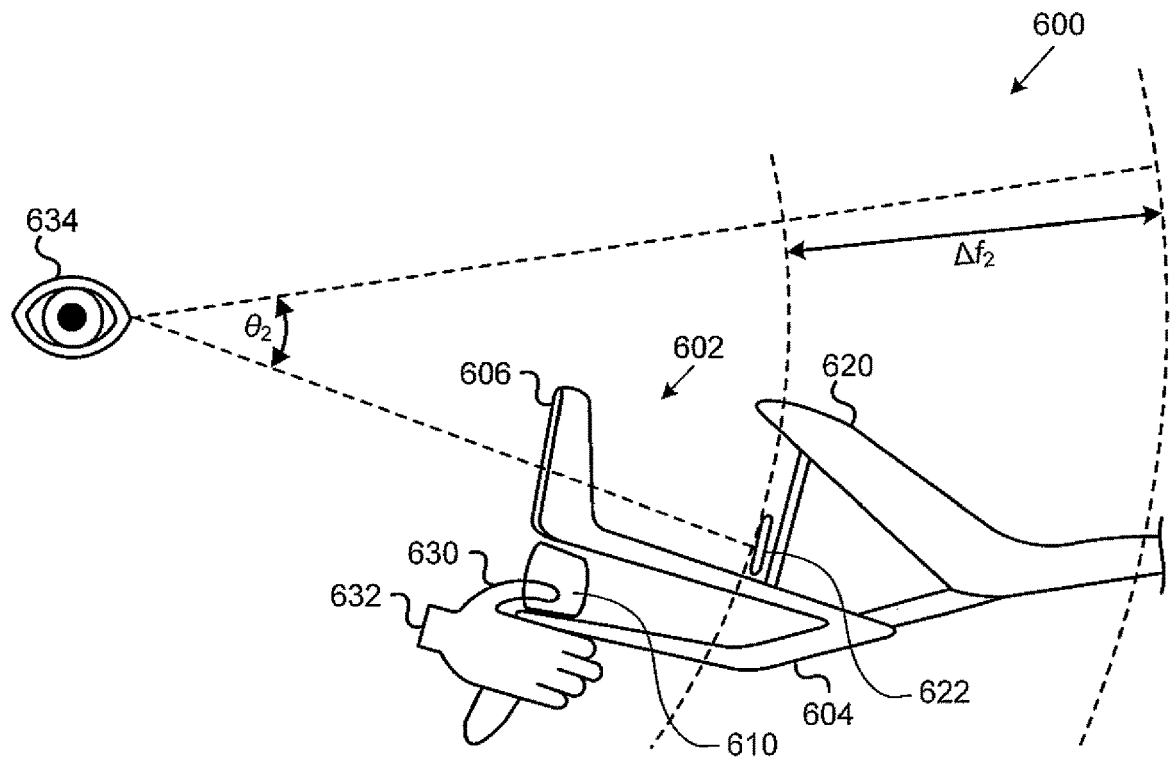
FIG. 6B illustrates a side view portion of an exemplary driver interface system according to one implementation of the present application.

FIG. 6B illustrates a side view portion of an exemplary driver interface system according to one implementation of the present application. Driver interface system 600 in FIG. 6B may generally correspond to driver interface system 600 in FIG. 6A, except that display 622 is located on dashboard 620 rather than steering wheel assembly 602. Images corresponding to present functions are separated from a variable-function input device in input area 610. Display 622 lies in a plane parallel to the plane of steering wheel 606, while input area 610 can be angled from the plane of steering wheel 606. As a result, input area 610 can be more ergonomic; while user's hand 632 maintains its grip on steering wheel 606, user's thumb 630 can activate a variable-function input device in input area 610 without needing to press perpendicular to the plane of steering wheel 606. Additionally, when a user looking at display 622 reverts to looking at the road ahead, user's eye 634 rotates through refocus angle $\theta_2$, and it changes focus length by refocus length $\Delta f_2$. Because refocus angle $\theta_2$ and refocus length $\Delta f_2$ are lower than refocus angle $\theta_1$ and refocus length $\Delta f_1$ driver interface system 600 in FIG. 6B can significantly improve driver reaction time. Moreover, driver interface system 600 does not require a user to reach off steering wheel 606 and still supports any number of functions.

Figure 7:
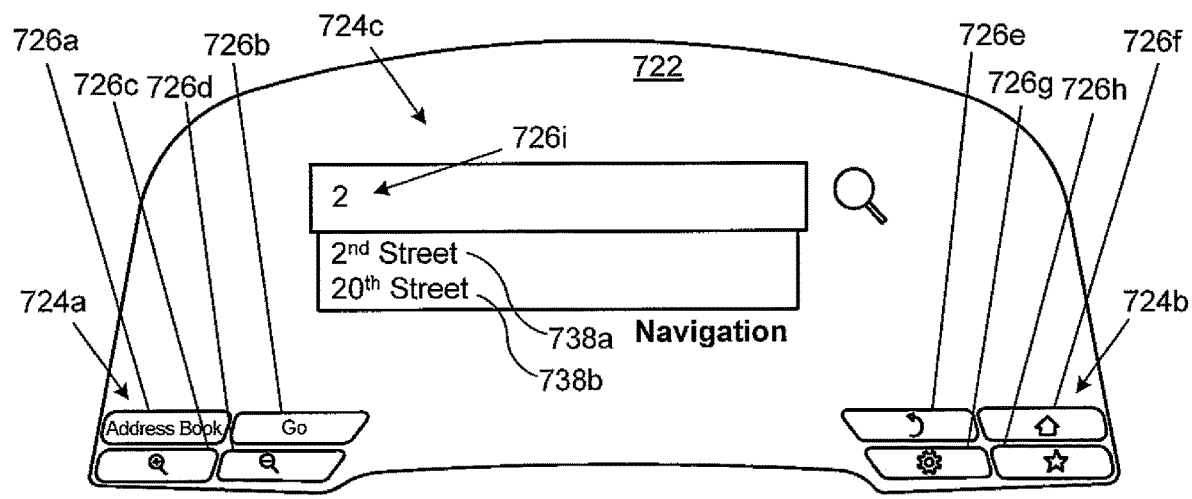
FIG. 7 illustrates a comparative view of a portion of a touchpad and a portion of a display according to one implementation of the present application.
Figure 7:
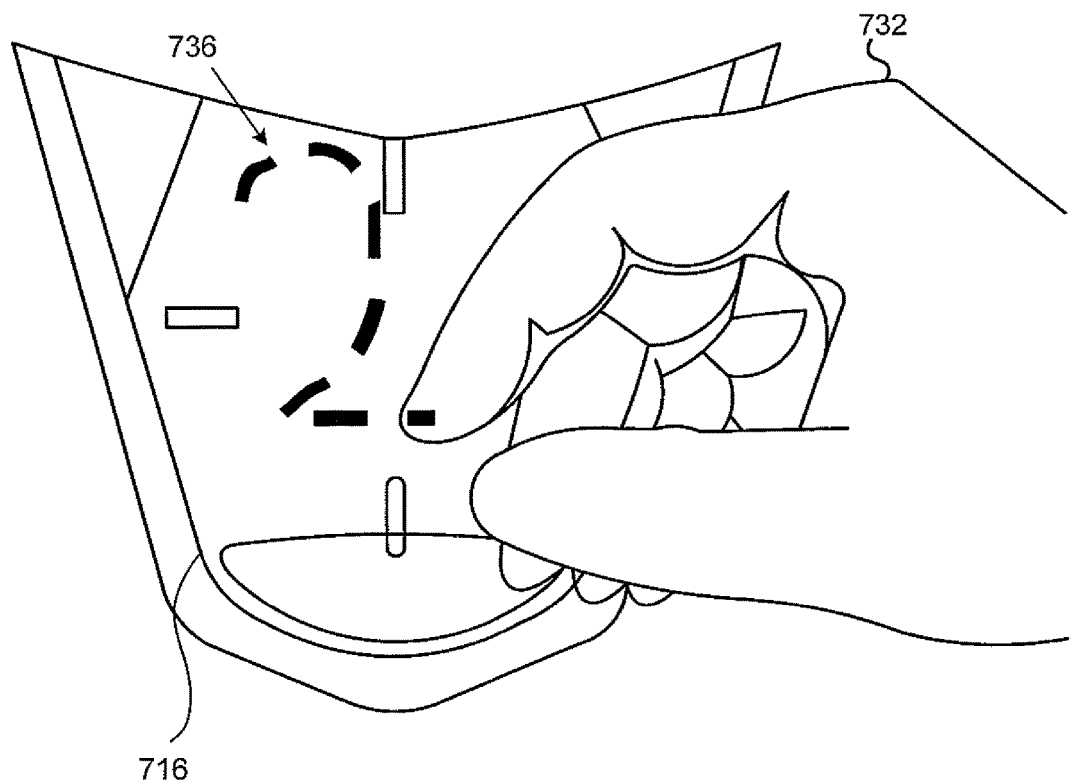

FIG. 7 illustrates a comparative view of a portion of a touchpad and a portion of a display according to one implementation of the present application. FIG. 7 shows touchpad 716, user's hand 732, and handwritten input 736 alongside display 722. Display 722 includes image areas 724a, 724b, and 724c, images 726a, 726b, 726c, 726d, 726e, 726f, 726g, 726h, and 726i, collectively referred to as images 726, and writing suggestions 738a and 738b. Touchpad 716 and display 722 in FIG. 7 may generally correspond to touchpad 116 and display 122 respectively in FIG. 1. Although touchpad 716 may be on a steering wheel and display 722 may be on a dashboard, they are shown alongside each other in FIG. 7 for the purpose of comparison.

In FIG. 7, steering wheel assembly 702 receives handwritten input 736 using touchpad 716. Display 722 displays image 726i corresponding to handwritten input 736 in image area 724c. In the present implementation, the driver interface system is in navigation mode. Images 726a, 726b, 726c, 726d, 726e, 726f, 726g, and 726h in FIG. 7 may generally correspond to images 326a, 326b, 326c, 326d, 326e, 326f, 326g, and 326h in FIG. 3B. Image area 724c is an address entry field. Touchpad 716 may illuminate when an entry field is active to prompt a user for handwritten input. As shown in FIG. 7, user's hand 732 writes handwritten input 736 on touchpad 716. In the present implementation, handwritten input 736 is the number "2." In various implementations, handwritten input 736 may be any other recordable gesture. Touchpad 716 may receive handwritten input 736 utilizing, for example, capacitive sensor measurements recorded over time. Display 722 displays the number "2" using image 726i in image area 724c. Display 722 may delay displaying image 726i until after user's hand 732 has been still or been removed from touchpad 716 for a predetermined time interval. The driver interface system may also reference handwritten input 736 against a database to generate writing suggestions. As shown in FIG. 7, display 722 also displays writing suggestions 738a and 738b in image area 724c below image 726i. In the present implementation, writing suggestion 738a and 738b are the phrases "$2^{nd}$ Street" and "$20^{th}$ Street" respectively. In various implementations, other writing suggestions 738a and 738b may be other phrases depending on handwritten input 736, the database, and the reference algorithm. In different display modes, display 716 may display different writings suggestions for the same handwritten input. By using touchpad 716, the driver interface system enables numerous functions that depend on freeform input like handwritten input 736. For example, handwritten input 736 can be used instead of voice commands or to clarify voice commands. As another example, handwritten input 736 can support gesture activated functions as a shortcut to activating functions using conventional input devices.

Figure 8B:
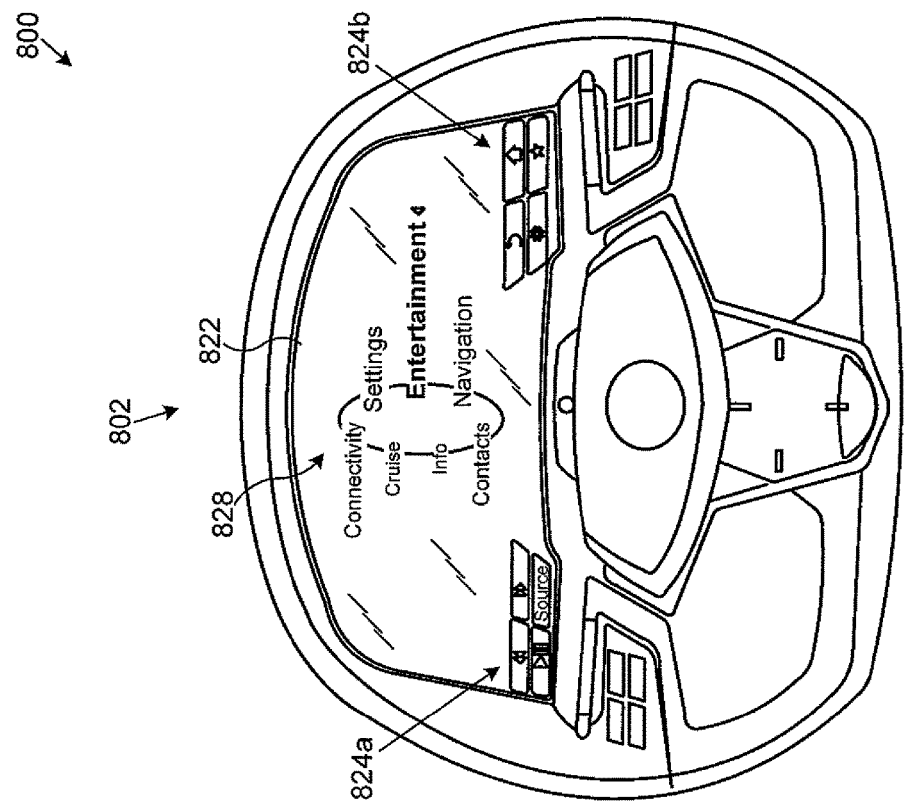
FIGS. 8A and 8B illustrate front views of a portion of a driver interface system according to one implementation of the present application.
Figure 8A:
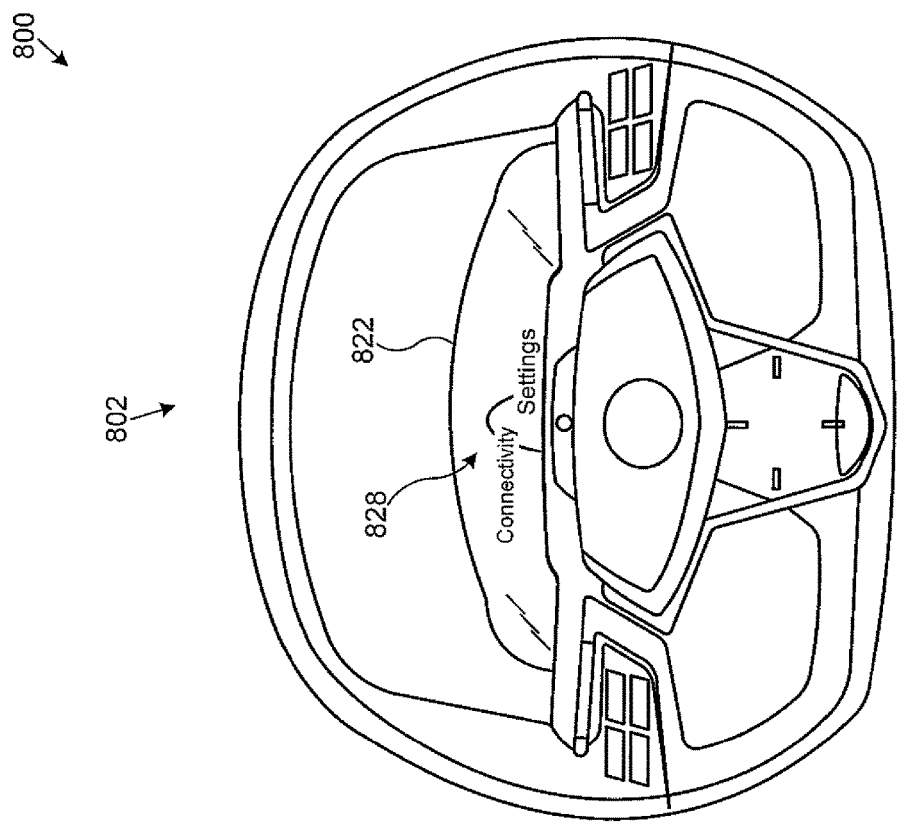

FIGS. 8A and 8B illustrate front views of a portion of a driver interface system according to one implementation of the present application. Driver interfaces system 800 in FIGS. 8A and 8B may generally correspond to driver interface system 200 in FIG. 2. FIGS. 8A and 8B may illustrate driver interface system 800 as seen by a user sitting in a driver seat. In FIG. 8A, the lower part of display 822 is partially obscured from the user's view by steering wheel assembly 802. Only an upper part of display mode menu 828 is visible. Display 822 may be obscured due to the user adjusting the driver seat to a position where his/her legs can reach pedals and his/her eyes can see over a dashboard.

In FIG. 8B, driver interface system 800 automatically adjusts to the user such that the display is visible. In particular, driver interface system 800 automatically adjusts to the user such that the image areas 824a and 824b and a lower part of display mode menu 828 are now visible. Driver interface system 800 can automatically adjust the position of steering wheel assembly 802 to the user based on a user height estimation. Driver interface system 800 may generate a user height estimation based on the position of the driver seat, which is known to correlate with the length of the user's legs and the height of the user. Steering wheel assembly 802 may include actuators or other means known in the art that enable it to tilt and translate based on the user height estimation. It is common practice for a user to manually adjust the positions of the driver seat and the steering wheel assembly, save the positions in memory together as seating configuration, and, if the positions of the driver seat and the steering wheel assembly are later adjusted, the vehicle can automatically restore their positions using the memorized seating configuration. Notably, by using driver interface system 800 to automatically adjust steering wheel assembly 802 to the user, a user need not manually adjust steering wheel assembly 802 in the first instance when initially saving a seating configuration. The user need only manually adjust the driver seat, and the steering wheel assembly will automatically adjust in response. This seat configuration can then be saved in memory. Display 822 may also include actuators or other means known in the art that enable it to tilt and translate based on the user height estimation.

As another example, driver interface system 800 can automatically adjust the position of steering wheel assembly 802 to the user based on an eye tracking input. Driver interface system 800 may include a video camera (not shown in FIGS. 8A and 8B) that records a user's eyes and generates an eye tracking input. The eye tracking input may be based on the user's eyes' position in three-dimensional space, their position relative to the user's head, their angle, whether the they are fixated or not, estimations of where they are fixated, and the frequency and duration of fixations. The video camera may be located, on display 822, steering wheel assembly 802, or a dashboard, as long as it can clearly see the user's eyes. The eye tracking input may also used by other systems in the vehicle such as crash prevention systems. Driver interface system 800 can also automatically adjust the position of display 822 to the user based on an eye tracking input. By using driver interface system 800 to automatically adjust to a user, display 822 is visible to the user. Thus, driver interface system 800 ensures image areas 824a and 824b on display 822 can be used to enable numerous assignable functions as described above. Additionally, other areas on display 822 will be readily visible to present additional information to a user.

Thus, various implementations of the present application achieve a driver interface system with high functionality that overcomes the deficiencies in the art. From the above description it is manifest that various techniques can be used for implementing the concepts described in the present application without departing from the scope of those concepts. For example, although the description above assumes the vehicle is a car, the present concepts are applicable to any other vehicles, such as airplanes, carts, and boats. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A driver interface system comprising:
a steering wheel assembly comprising a first variable-function input device configured to cause a first present function to be performed upon activation of the variable-function input device by the driver, said first variable-function input device having a plurality of assignable functions and the first present function being one of said plurality of assignable functions, wherein the first present function is determined based on a display mode of a display located proximate to the driver;
wherein the display is configured to display a first image corresponding to said first present function of said first variable-function input device;
wherein the system is configured to change the first present function to a first different assignable function in response to a change in the display mode of the plurality of display modes;
a second variable-function input device configured to cause a second present function to be performed upon activation of the second variable-function input device by the driver, said second variable-function input device having the plurality of assignable functions and the second present function being one other function of said plurality of assignable functions, wherein the second present function is determined based on the display mode of the display located proximate to the driver;
wherein the display is configured to display a second image corresponding to said second present function of said variable-function input device;
wherein the system is configured to change the second present function to a second different assignable function in response to the change in the display mode of the plurality of display modes.

2. The driver interface system of claim 1, wherein said first variable-function input device is selected from the group consisting of at least one button and at least one a touch screen.

3. The system of claim 1, wherein said first variable-function input device comprises a sensor configured to distinguish a light press from a hard press.

4. The driver interface system of claim 3, wherein in response to said light press, said display highlights said image.

5. The driver interface system of claim 3, wherein in response to said hard press, said driver interface system performs said first present function.

6. The driver interface system of claim 3, wherein in response to said hard press, said driver interface system provides sensory feedback.

7. The driver interface system of claim 1, wherein said display mode is selected from the group consisting of an entertainment mode, a navigation mode, a contacts mode, a connectivity mode, a cruise/autonomous mode, and a vehicle information mode.

8. The driver interface system of claim 1, wherein, in response to a user action or a priority event, said driver interface system changes said display mode.

9. The driver interface system of claim 1, wherein said display is a dashboard display.

10. The driver interface system of claim 1, wherein said driver interface system automatically adjusts based on a user height estimation such that the display is visible to said user.

11. The driver interface system of claim 1, wherein said driver interface system automatically adjusts based on a user eye tracking input such that the display is visible to said user.

12. A driver interface system comprising:
- a display;
- wherein the display includes a display mode menu, wherein the display mode menu includes a plurality of display modes;
- a steering wheel assembly comprising:
  - a touchpad configured to receive a handwritten input;
  - a first variable-function input device, said first variable-function input device having a plurality of assignable functions and a first present function being one of said plurality of assignable functions, wherein the first present function is determined based on a selected display mode, wherein the first variable-function input device is configured to cause the first present function to be performed upon activation of the first variable-function input device by the driver;
  - a second variable-function input device configured to cause a second present function to be performed upon activation of the second variable-function input device by the driver, said second variable-function input device having the plurality of assignable functions and the second present function being one other function of said plurality of assignable functions, wherein the second present function is determined based on the display mode of the display located proximate to the driver; wherein the display is configured to:
- display a first image corresponding to said handwritten input;
- display a second image corresponding to said first present function of said first variable-function input device, and display a third image corresponding to said second present function of said second variable-function input device, wherein the system is configured to change the first present function to a first different assignable function and the second present function to a second different assignable function in response to a change in the selected display mode.

13. The driver interface system of claim 12, wherein said first variable-function input device is elected from the group consisting of at least one button and at least one a touch screen.

14. The driver interface system of claim 12, wherein said display mode is selected from the group consisting of an entertainment mode, a navigation mode, a contacts mode, a connectivity mode, a cruise/autonomous mode, and a vehicle information mode.

15. The driver interface system of claim 12, wherein, in response to a user action or a priority event, said driver interface system changes said display mode.

16. The driver interface system of claim 1, wherein the first variable-function input device comprises a first rotary dial and second rotary dial and a touchpad configured to receive a handwritten input.

17. The driver interface system of claim 16, wherein the first rotary dial is diametrically opposed to the second rotary dial relative to the steering wheel.

18. The driver interface system of claim 12, wherein the first variable-function input device comprises a first rotary dial and second rotary dial.

19. The driver interface system of claim 18, wherein the first rotary dial is diametrically opposed to the second rotary dial relative to the steering wheel.

* * * * *